(12) United States Patent
Wang et al.

(10) Patent No.: US 9,688,535 B2
(45) Date of Patent: Jun. 27, 2017

(54) METHOD FOR USING CARBON NANOTUBE FILM SUPPORTING STRUCTURE

(71) Applicant: Beijing FUNATE Innovation Technology Co., LTD., Beijing (CN)

(72) Inventors: Yu-Quan Wang, Beijing (CN); Chen Feng, Beijing (CN); Li Qian, Beijing (CN); Liang Liu, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 0 days.

(21) Appl. No.: 14/709,874

(22) Filed: May 12, 2015

(65) Prior Publication Data
US 2015/0246519 A1    Sep. 3, 2015

Related U.S. Application Data

(62) Division of application No. 13/114,947, filed on May 24, 2011, now abandoned.

(30) Foreign Application Priority Data

Oct. 27, 2010  (CN) .......................... 2010 1 0521688

(51) Int. Cl.
| | |
|---|---|
| *H01J 9/00* | (2006.01) |
| *C01B 31/02* | (2006.01) |
| *B82Y 30/00* | (2011.01) |
| *B82Y 40/00* | (2011.01) |
| *B32B 3/30* | (2006.01) |
| *B32B 9/00* | (2006.01) |
| *B32B 29/00* | (2006.01) |
| *B32B 37/14* | (2006.01) |
| *B32B 37/18* | (2006.01) |

(52) U.S. Cl.
CPC ............ *C01B 31/0253* (2013.01); *B32B 3/30* (2013.01); *B32B 9/00* (2013.01); *B32B 29/002* (2013.01); *B32B 37/144* (2013.01); *B32B 37/18* (2013.01); *B82Y 30/00* (2013.01); *B82Y 40/00* (2013.01); *B32B 2307/70* (2013.01); *B32B 2307/744* (2013.01); *B32B 2313/04* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 2003/0124325 A1* | 7/2003 | Rueckes | ................ | B82Y 10/00 428/209 |
| 2009/0255529 A1* | 10/2009 | Liu et al. | ...................... | 126/680 |

* cited by examiner

*Primary Examiner* — Nkeisha Smith
(74) *Attorney, Agent, or Firm* — Steven Reiss (57) ABSTRACT

A method for using a carbon nanotube film supporting structure includes: providing a carbon nanotube film structure and a carbon nanotube film supporting structure, the carbon nanotube film supporting structure comprises a substrate and a plurality of protruding structures, the substrate having a surface defining a support region, the plurality of protruding structures distributed on support region, a ratio of a sum of a plurality of surface areas, defined by the top of the plurality of protruding structures, to an area of the support region, is less than or equal to 20%; and placing the carbon nanotube film structure on the support region of the carbon nanotube film supporting structure.

18 Claims, 10 Drawing Sheets

Providing a carbon nanotube film structure and a carbon nanotube film supporting structure, the carbon nanotube film supporting structure includes a substrate and a number of protruding structures, the substrate having a surface defining a support region, the protruding structures are distributed on the support region, a ratio of a sum of a number of surface areas, defined by the top of the protruding structures, to an area of the support region, is less than or equal to 20%

Placing the carbon nanotube film structure on the support region of the carbon nanotube film supporting structure

METHOD FOR USING CARBON NANOTUBE FILM SUPPORTING STRUCTURE

CROSS-REFERENCE TO RELATED APPLICATIONS

This application is a division application of U.S. patent application Ser. No. 13/114,947, filed on May 24, 2011, entitled "CARBON NANOTUBE FILM SUPPORTING STRUCTURE AND METHOD FOR USING SAME," which claims all benefits accruing under 35 U.S.C. §119 from China Patent Application No. 201010521688.X, filed on Oct. 27, 2010 in the China Intellectual Property Office, the contents of which are hereby incorporated by reference. The application is also related to copending application entitled, "CARBON NANOTUBES FILM SUPPORTING STRUCTURE AND METHOD FOR USING THE SAME," filed May 24, 2011 Ser. No. 13/114,953.

BACKGROUND

1. Technical Field

The present disclosure relates to a carbon nanotube film supporting structure and a method for using the carbon nanotube film supporting structure.

2. Description of Related Art

Carbon nanotubes are tubules of carbon generally having diameters ranging from 0.5 nanometers to 100 nanometers. Carbon nanotubes have recently attracted a great deal of attention for use in different applications such as field emitters, gas storage and separation, chemical sensors, and high strength composites, because of their thermal, electrical, and mechanical properties.

However, because carbon nanotubes are microscopic structures, it is necessary to assemble the carbon nanotubes at a macroscopic level. Moreover, carbon nanotube film is only one kind of macroscopic structure of carbon nanotubes.

Recently, as disclosed by the pre-grant publication US20080248235 to Feng et al., a free-standing carbon nanotube film has been fabricated. The carbon nanotube film can be used in many different fields. For example, the carbon nanotube film can be used as a transparent conductive film in a touch panel or a liquid display, which can be flexible.

However, this kind of carbon nanotube film is very thin. In the carbon nanotube film, the adjacent carbon nanotubes are combined and are attracted by the van der Waals force therebetween, which is relatively weak. An external mechanical force applied on the carbon nanotube film may easily damage or destroy the film. Furthermore, the carbon nanotube film has an extremely large specific surface area, which makes the carbon nanotubes adhesive and difficult to handle, particularly if a large amount of carbon nanotube films are fabricated.

What is needed, therefore, is to provide a carbon nanotube film supporting structure and a method for using the carbon nanotube film supporting structure, which can overcome the above-described shortcomings.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
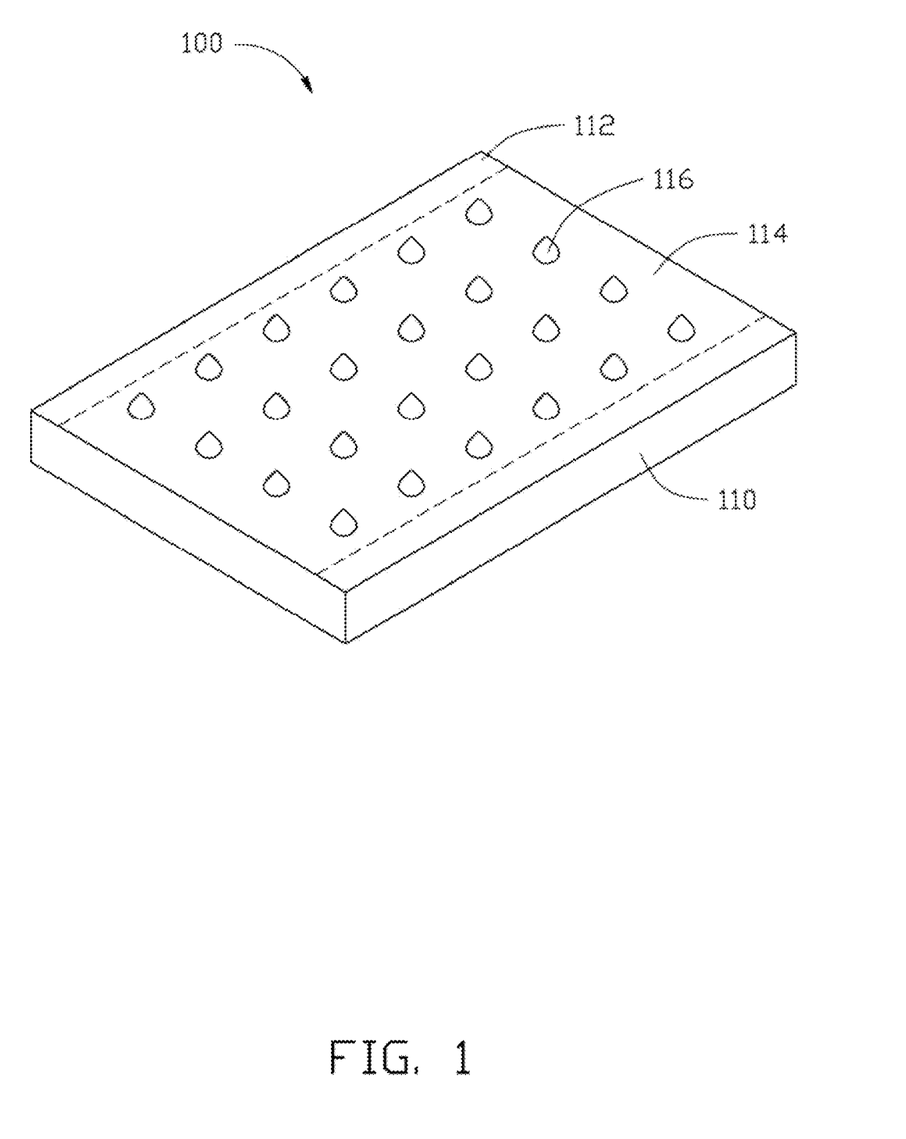
FIG. 1 shows a schematic structural view of one embodiment of a carbon nanotube film supporting structure.

Referring to FIG. 1, a carbon nanotube film supporting structure 100 is provided. The carbon nanotube film supporting structure 100 can be used for supporting or protecting a carbon nanotube film structure. The carbon nanotube film structure can be peeled off completely from the carbon nanotube film supporting structure 100. The carbon nanotube film supporting structure 100 includes a substrate 110 and a number of protruding structures 116. In one embodiment, the protruding structure 116 has a dotted configuration, e.g. raised surface areas. The substrate 110 has a surface 112. A support region 114 is one part of the surface 112. The protruding structures 116 are, uniformly or not, distributed on the support region 114. A ratio of a sum of a number of surface areas, defined by the top of the protruding structures 116, to an area of the support region 114, is less than or equal to 20%. In other embodiments, the ratio of the sum of the number of surface areas, defined by the top of the protruding structures 116, to the area of the support region 114, is less than or equal to 10%.

The protruding structures 116 can be used for supporting the carbon nanotube film structure. If the carbon nanotube film structure is applied on the support region 114, point contact or linear contact is formed between the carbon nanotube film structure and each protruding structure 116. An effective contact area between the carbon nanotube film structure and the carbon nanotube film supporting structure 100 can be less than or equal to 20% of the total area of the carbon nanotube film structure. Therefore, the carbon nanotube film structure can be peeled off completely after being in contact with the carbon nanotube film supporting structure 100. In other embodiments, the effective contact area between the carbon nanotube film structure and the carbon nanotube film supporting structure 100 can be less than or equal to 10% of the total area of the carbon nanotube film structure.

The substrate 110 can be a sheet structure having certain mechanical strength. A material of the substrate 110 can be metal, metal oxide, inorganic salts, ceramics, or resin. Shape and size of the substrate 110 are not limited.

The surface 112 of the substrate 110 can be a flat surface, a curved surface, or irregular surface. The area of the support region 114 can be equal to or less than an area of the surface 112. The protruding structures 116, distributed on the support region 114, can be spaced from each other. A material of the protruding structures 116 can be metal, metal oxide, inorganic salts, ceramics, or resin. The protruding structures 116 can be formed on the surface 112 of the substrate 110 by chemical method or physical method. A shape of the protruding structures 116 can be sphere, ellipsoid, or other shapes. Because the protruding structures 116 have small volume, the protruding structures 116 can be seemed as sphere.

In one embodiment, the protruding structures 116 are distributed uniformly on the surface 112 of substrate 110. The shape of the protruding structures 116 is sphere. A diameter of the sphere can be in a range from about 1 micrometer to about 1000 micrometers. A distance between adjacent spheres can be in a range from about 10 micrometers to about 10 millimeters. Alternatively, size and distribution conditions of the protruding structures 116 vary in different embodiments. The substrate 110 and the protruding structures 116 can be an integral structure. In some embodiments, the protruding structures 116 are distributed unevenly in the support region 114.

In one embodiment, the carbon nanotube film supporting structure 100 is a NO. 100 abrasive paper. The NO. 100 abrasive paper includes a number of dotted protruding structures distributed uniformly on a surface of the NO. 100 abrasive paper. The diameter of the dotted protruding structures on the surface of NO. 100 abrasive paper is about 150 micrometers. The distance between adjacent dotted protruding structures is about 200 micrometers. Alternatively, the carbon nanotube film supporting structure 100 can also be selected from other types of the abrasive paper (e.g. NO. 50~NO. 2000 abrasive paper).

Figure 2:
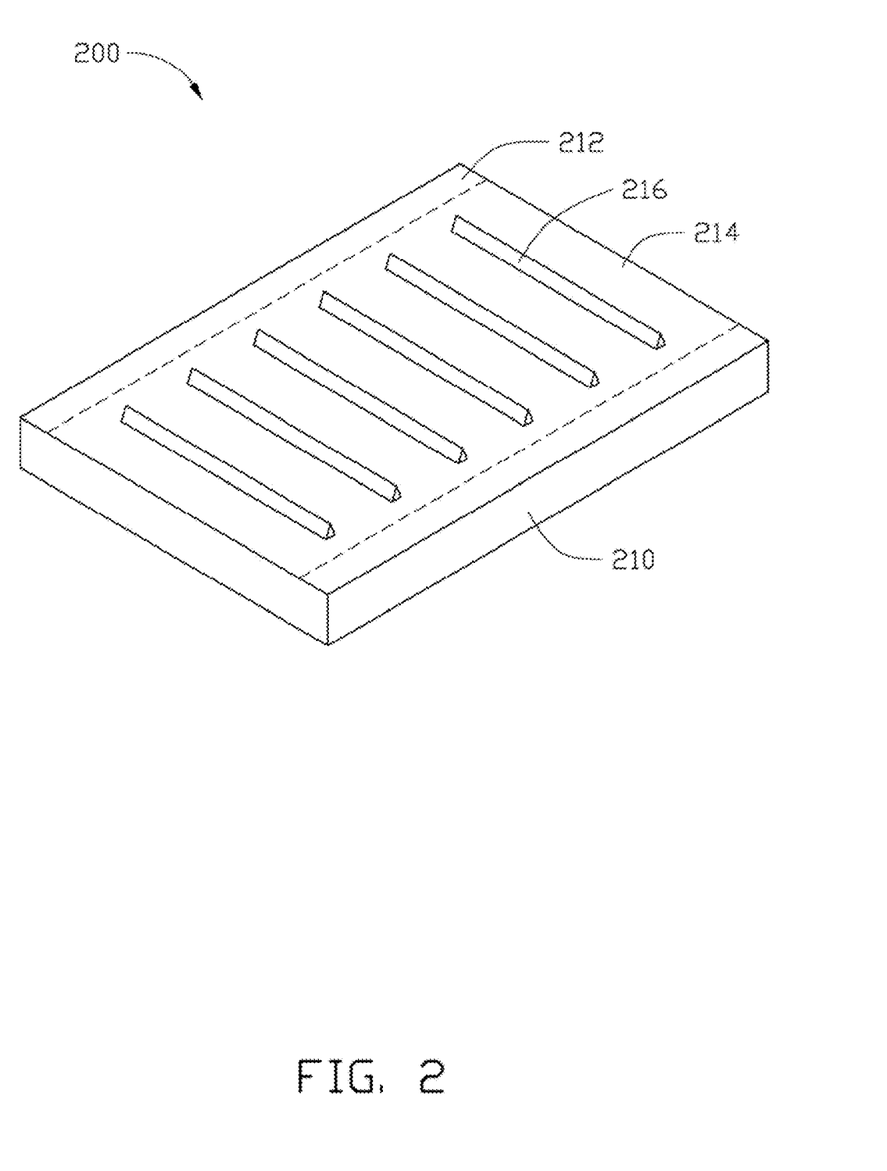
FIG. 2 shows a schematic structural view of another embodiment of a carbon nanotube film supporting structure.

Referring to FIG. 2, a carbon nanotube film supporting structure 200 according to another embodiment is disclosed. The carbon nanotube film supporting structure 200 includes a substrate 210 and a number of linear protruding structures 216. The substrate 210 has a surface 212. A support region 214 is one part of the surface 212. The linear protruding structures 216 are distributed on the support region 214. A ratio of a sum of a number of surface areas, defined by the top of the linear protruding structures 216, to an area of the support region 214, is less than or equal to 20%. In other embodiments, the ratio of the sum of the number of surface areas, defined by the top of the linear protruding structures 216, to the area of the support region 214, is less than or equal to 10%.

The linear protruding structures 216 can be used for supporting the carbon nanotube film structure. When a carbon nanotube film structure is placed on the support region 214, linear contact can be formed between the carbon nanotube film structure and each of the linear protruding structures 216. The effective contact area between the carbon nanotube film structure and the carbon nanotube film supporting structure 200 can be less than or equal to 20% of the total area of the carbon nanotube film structure. Therefore, the carbon nanotube film structure can be peeled off completely after being in contact with the carbon nanotube film supporting structure 200. In other embodiments, the effective contact area between the carbon nanotube film structure and the carbon nanotube film supporting structure 200 can be less than or equal to 10% of the total area of the carbon nanotube film structure.

The surface 212 of the substrate 210 can be a flat surface, a curved surface, or irregular surfaces. The support region 214 can be the surface 212 or one part of the surface 212. The linear protruding structures 216, distributed on the support region 214, can be placed from each other. A material of the linear protruding structures 116 can also be metal, metal oxide, inorganic salts, ceramics, or resin. The linear protruding structures 216 can be formed on the surface 212 of the substrate 210 by chemical method or physical method. The shape of cross section of the linear protruding structures 216 can be triangle, square, rectangle, trapezium, or other shapes. Additionally, linear protruding structures 216 can be integral with the substrate 210.

In one embodiment, a number of the linear protruding structures 216 parallel to each other are distributed uniformly in the support region 214. A width of the linear protruding structures 216 can be in a range from about 1 micrometer to about 100 micrometers. A distance between adjacent linear protruding structures 216 can be in a range from about 10 micrometers to about 1000 micrometers. A height of the linear protruding structures 216 can be in a range from about 1 micrometer to about 1000 micrometers. Alternatively, size and distribution conditions of the linear protruding structures 216 can be changed according to different embodiments. In some embodiments, the linear protruding structures 216 are distributed unevenly in the support region 214.

In one embodiment according to FIG. 2, the linear protruding structures on a metal film are parallel to each other. The linear protruding structures are distributed uniformly on a surface of the metal film. The linear protruding structure is obtained by physical method. A shape of cross section of the linear protruding structures is triangle. A bottom width of the linear protruding structures is about 500 micrometers. The distance between adjacent linear protruding structures is about 50 micrometers.

Other characteristics of the carbon nanotube supporting structure 200 are the same as the carbon nanotube supporting structure 100 disclosed above.

The carbon nanotube film supporting structure disclosed in the present disclosure has characteristics of simple structure and low cost. Furthermore, by simply fixing a number of protruding structures (e.g., dotted protruding structures, linear protruding structures, or the combination thereof) on the surface of the carbon nanotube film supporting structure, the carbon nanotube film supporting structure can be used to support and/or protect carbon nanotube film structures. In addition, the carbon nanotube film structures can be separated from the carbon nanotube film supporting structure without damage.

Figure 3:
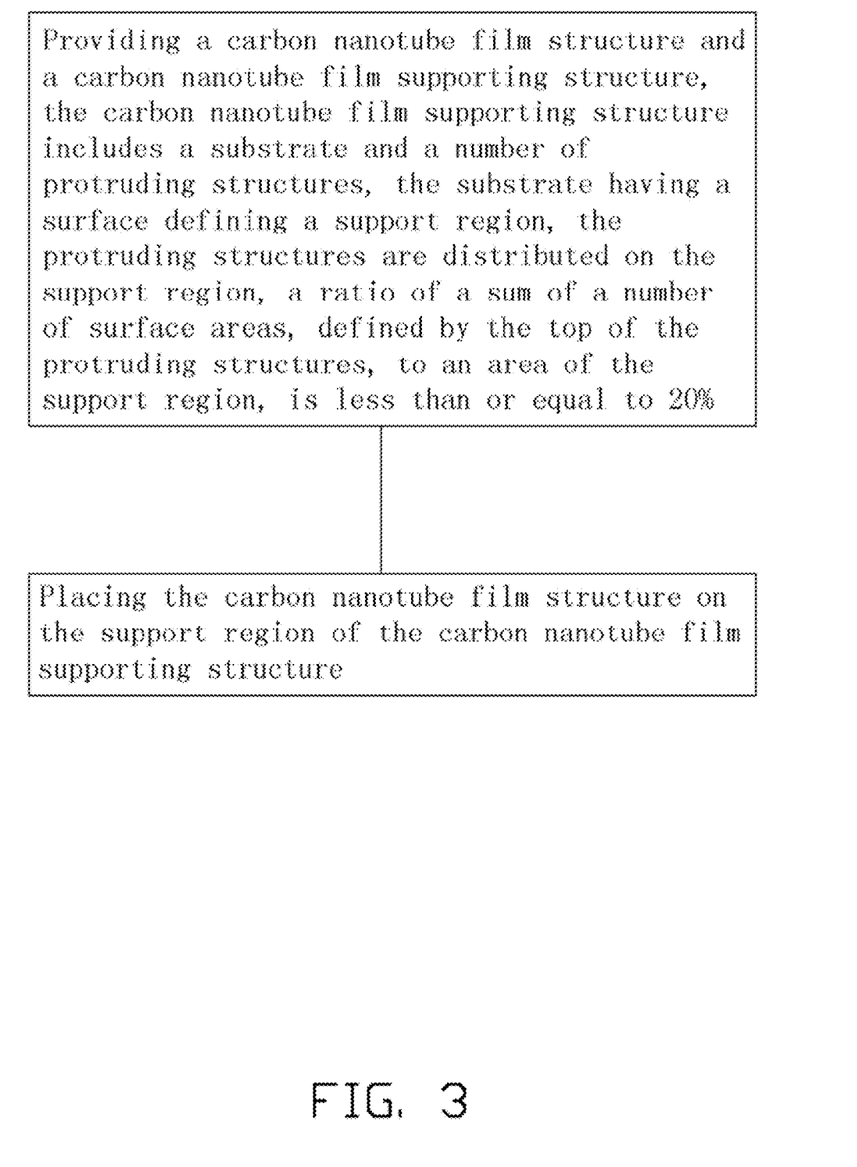
FIG. 3 shows a flow chart of a embodiment of using the carbon nanotube film supporting structure.

Referring to FIG. 3, an embodiment of a method for using the carbon nanotube film supporting structure disclosed above is also provided. The method includes the following steps:

(S1) providing a carbon nanotube film structure and a carbon nanotube film supporting structure, the carbon nanotube film supporting structure includes a substrate and a number of protruding structures, the substrate having a surface defining a support region, the protruding structures are distributed on the support region, a ratio of a sum of a number of surface areas, defined by the top of the protruding structures, to an area of the support region, is less than or equal to 20%; and (S2) placing the carbon nanotube film structure on the support region of the carbon nanotube film supporting structure.

In step (S1), the substrate can be a sheet structure having certain mechanical strength. A material of the substrate can be metal, metal oxide, ceramics, or resin. The surface of the substrate can be a flat surface, a curved surface, or irregular surfaces. An area of the support region can be equal to or less than an area of the surface. The protruding structures can be distributed uniformly on the support region. The protruding structures can be dotted protruding structures, linear protruding structures or the combination thereof. A material of the protruding structures can be metal, metal oxide, inorganic salts, ceramics, or resin. The protruding structures can be formed on the surface of the substrate by chemical method or physical method. A shape of the dotted protruding structures can be sphere, ellipsoid, or other shapes. Because the dotted protruding structures have small volume, the protruding structures 116 can be seemed as spheres. A diameter of the spheres can be in a range from about 1 micrometer to about 1000 micrometers. The distance between adjacent spheres can be in a range from about 10 micrometers to about 10 millimeters.

A cross-section of the linear protruding structures can be triangle, square, rectangle, trapezium, or other shapes. The linear protruding structures can be parallel to each other. A width of the linear protruding structures is in a range from about 1 micrometer to about 100 micrometers. A distance between adjacent linear protruding structures is in a range from about 10 micrometers to about 1000 micrometers. A height of the linear protruding structures is in a range from about 1 micrometer to about 1000 micrometers.

The carbon nanotube film structure includes at least one carbon nanotube film.

Figure 4:
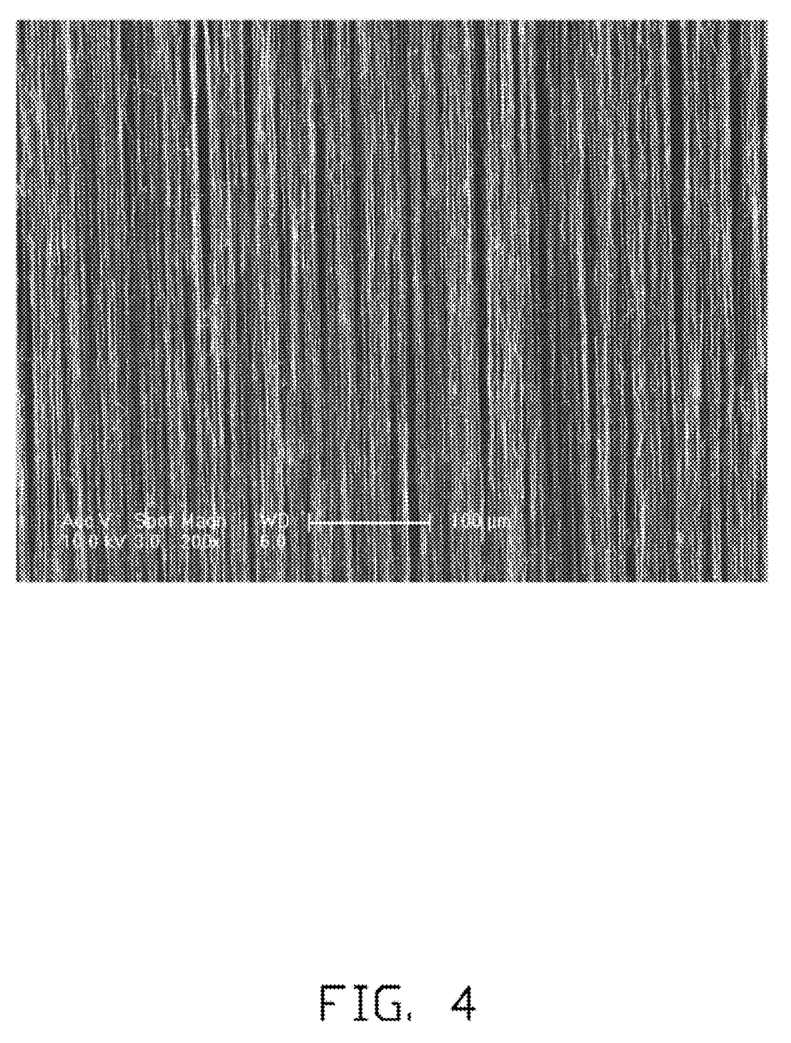
FIG. 4 is a Scanning Electron Microscope (SEM) image of a carbon nanotube film.

Referring to FIG. 4, the carbon nanotube film can be a drawn carbon nanotube film formed by drawing a film from a carbon nanotube array. Examples of the drawn carbon nanotube film are taught by U.S. Pat. No. 7,045,108 to Jiang et al. The thickness of the drawn carbon nanotube film can be in a range from about 0.5 nm to about 100 micrometers.

The drawn carbon nanotube film includes a number of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals force, to form a free-standing film. The term 'free-standing' includes films that do not have to be supported by a substrate. A small number of the carbon nanotubes are randomly arranged in the drawn carbon nanotube film, and has a small if not negligible effect on the larger number of the carbon nanotubes in the drawn carbon nanotube film arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that contact between some carbon nanotubes located substantially side by side and oriented along the same direction cannot be totally excluded.

More specifically, the drawn carbon nanotube film can include a number of successively oriented carbon nanotube segments joined end-to-end by van der Waals force therebetween. Each carbon nanotube segment includes a number of carbon nanotubes substantially parallel to each other, and joined by van der Waals force therebetween. The carbon nanotube segments can vary in width, thickness, uniformity and shape. The carbon nanotubes in the drawn carbon nanotube film are also substantially oriented along a preferred orientation. The width of the drawn carbon nanotube film relates to the carbon nanotube array from which the drawn carbon nanotube film is drawn.

The carbon nanotube film structures can include more than one drawn carbon nanotube film. An angle can exist between the orientation of carbon nanotubes in adjacent films, stacked and/or coplanar. Adjacent carbon nanotube films can be combined by only the van der Waals force therebetween without the need of an additional adhesive. An angle between the aligned directions of the carbon nanotubes in two adjacent drawn carbon nanotube films can range from about 0 degrees to about 90 degrees. Spaces are defined between two adjacent carbon nanotubes in the drawn carbon nanotube film. When the angle between the aligned directions of the carbon nanotubes in adjacent drawn carbon nanotube films is larger than 0 degrees.

Figure 5:
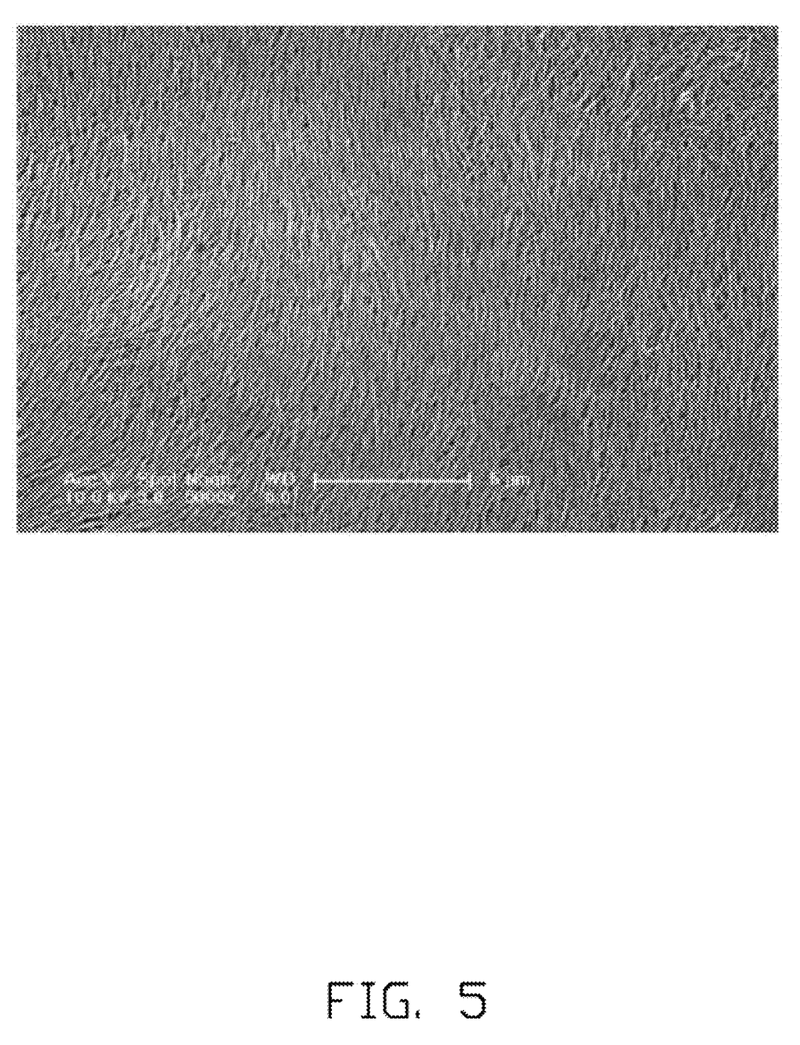
FIG. 5 is a SEM image of a pressed carbon nanotube film.

Referring to FIG. 5, the carbon nanotube film can also be a pressed carbon nanotube film formed by pressing a carbon nanotube array down on the substrate. The carbon nanotubes in the pressed carbon nanotube array are arranged along a same direction or along different directions. The carbon nanotubes in the pressed carbon nanotube array can rest upon each other. Adjacent carbon nanotubes are attracted to each other and combined by van der Waals force. An angle between a primary alignment direction of the carbon nanotubes and a surface of the pressed carbon nanotube array is about 0 degrees to approximately 15 degrees. The greater the pressure applied, the smaller the angle obtained. When the carbon nanotubes in the pressed carbon nanotube array are arranged along different directions, the carbon nanotube structures can be isotropic. The thickness of the pressed carbon nanotube array can range from about 0.5 nm to about 1 millimeter. The length of the carbon nanotubes can be larger than 50 micrometers. Examples of the pressed carbon nanotube film are taught by U.S. PGPub. 20080299031A1 to Liu et al.

Figure 6:
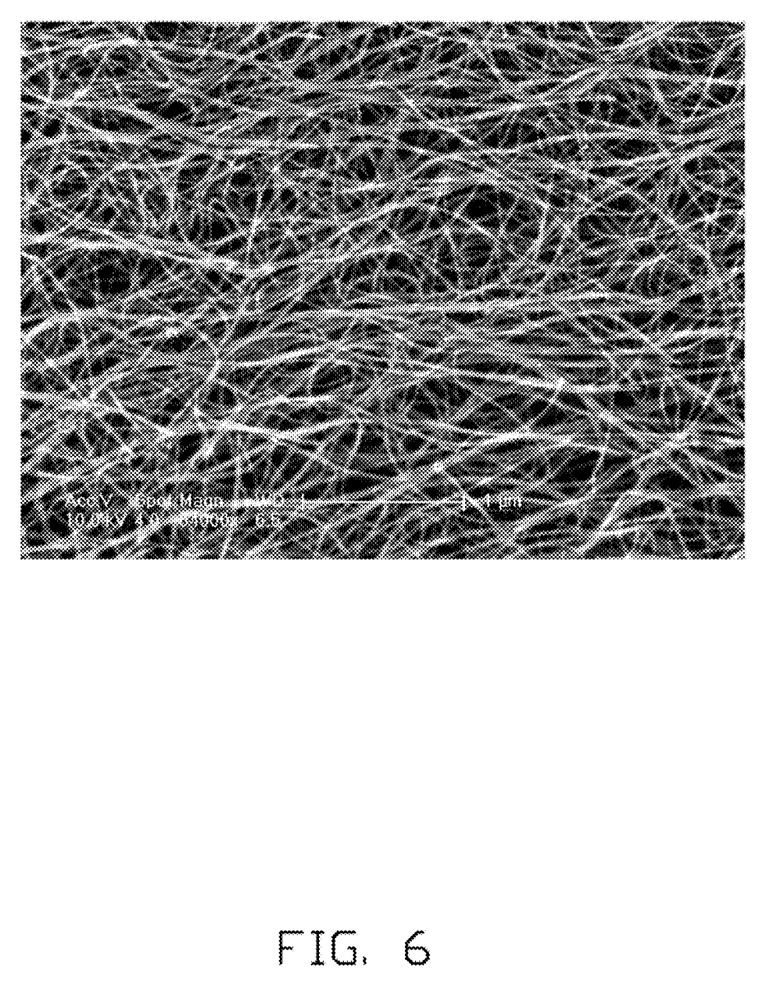
FIG. 6 is a SEM image of a flocculated carbon nanotube film.

Referring to FIG. 6, the carbon nanotube film can also be a flocculated carbon nanotube film formed by a flocculating method. The flocculated carbon nanotube film can include a number of long, curved, disordered carbon nanotubes entangled with each other. A length of the carbon nanotubes can be greater than 10 centimeters. In one embodiment, the length of the carbon nanotubes is in a range from about 200 microns to about 900 micrometers. Further, the flocculated carbon nanotube film can be isotropic. Here, "isotropic" means the carbon nanotube film has properties identical in all directions substantially parallel to a surface of the carbon nanotube film. The carbon nanotubes can be substantially uniformly distributed in the carbon nanotube film. The adjacent carbon nanotubes are acted upon by the van der Waals force therebetween. The thickness of the flocculated carbon nanotube film can range from about 1 micrometers to about 1 millimeter.

In one embodiment, the carbon nanotube film structure is a drawn carbon nanotube film. A method for making the drawn carbon nanotube film can include the sub-steps: (S11)

providing a carbon nanotube array capable of having a film drawn therefrom; and (S12) pulling/drawing out a drawn carbon nanotube film from the carbon nanotube array. The pulling/drawing can be done by using a tool (e.g., adhesive tape, pliers, tweezers, or another tool allowing multiple carbon nanotubes to be gripped and pulled simultaneously).

In step (S11), the given carbon nanotube array can be formed by a chemical vapor deposition (CVD) method. The carbon nanotube array includes a number of carbon nanotubes parallel to each other and approximately perpendicular to the substrate. The carbon nanotubes in the carbon nanotube array are closely packed together by van der Waals force. The carbon nanotubes in the carbon nanotube array can be single-walled carbon nanotubes, double-walled carbon nanotubes, multi-walled carbon nanotubes, or combinations thereof. The diameter of the carbon nanotubes can be in a range from about 0.5 nanometers to about 50 nanometers. The height of the carbon nanotubes can be in a range from about 50 nanometers to 5 millimeters. In one embodiment, the height of the carbon nanotubes can be in a range from about 100 microns to 900 microns.

In step (S12), the drawn carbon nanotube film includes a number of carbon nanotubes, and there are interspaces between adjacent two carbon nanotubes. Carbon nanotubes in the drawn carbon nanotube film can be substantially parallel to a surface of the drawn carbon nanotube film. A distance between adjacent two carbon nanotubes can be larger than a diameter of the carbon nanotubes. The drawn carbon nanotube film can be pulled/drawn by the following sub-steps: (S121) selecting a carbon nanotube segment having a predetermined width from the carbon nanotube array; and (S122) pulling the carbon nanotube segment at an even/uniform speed to achieve a uniform drawn carbon nanotube film.

In step (S121), the carbon nanotube segment having a predetermined width can be selected by using an adhesive tape such as the tool to contact the carbon nanotube array. The carbon nanotube segment includes a number of carbon nanotubes parallel to each other. In step (S122), the pulling direction is arbitrary (e.g., substantially perpendicular to the growing direction of the carbon nanotube array).

More specifically, during the pulling process, as the initial carbon nanotube segment is drawn out, other carbon nanotube segments are also drawn out end-to-end due to the van der Waals force between ends of adjacent segments. This process of drawing ensures that a continuous, uniform carbon nanotube film having a predetermined width can be formed. The drawn carbon nanotube film has an extremely large specific surface area, and so is very sticky and difficult to handle, particularly when a large amount of carbon nanotube films are fabricated.

Figure 7:
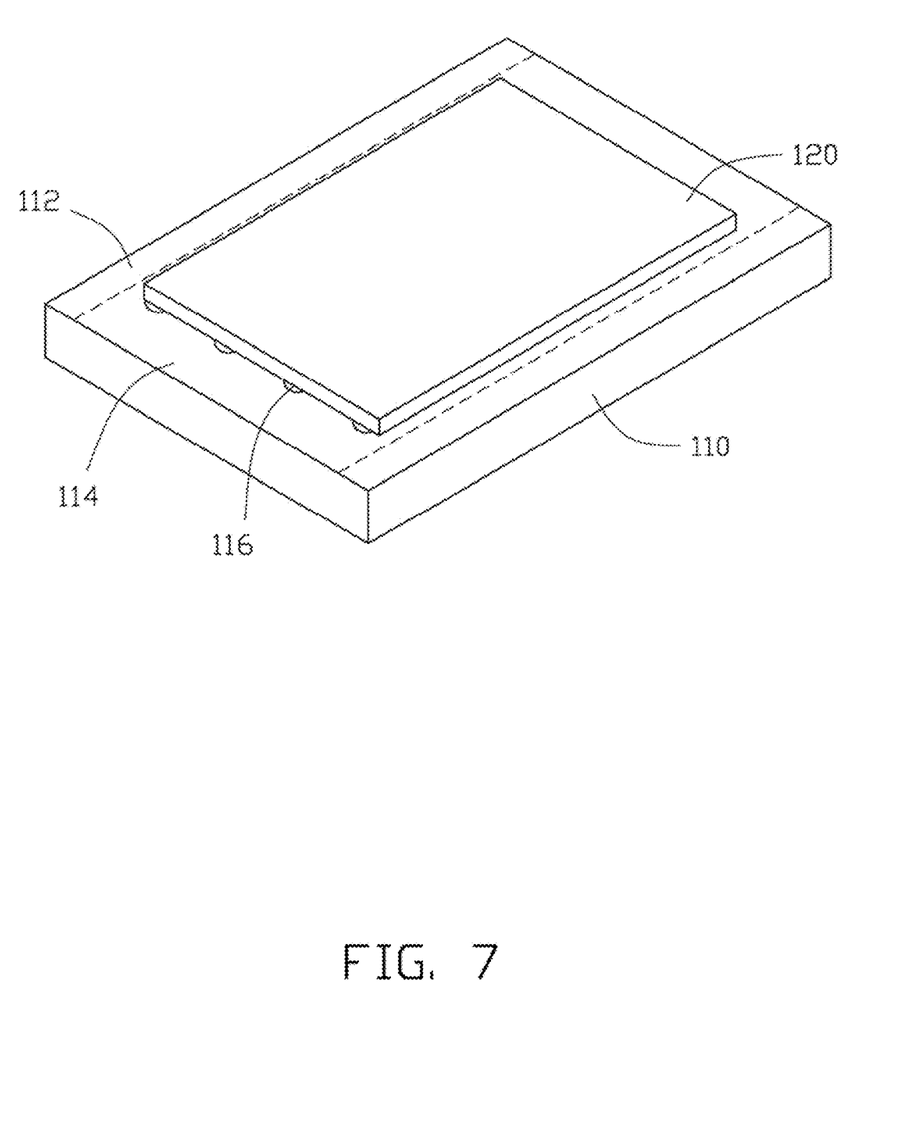
FIG. 7 shows a schematic structural view of a carbon nanotube film structure located on a support region of the carbon nanotube film supporting structure of FIG. 1 according to one embodiment.
Figure 8:
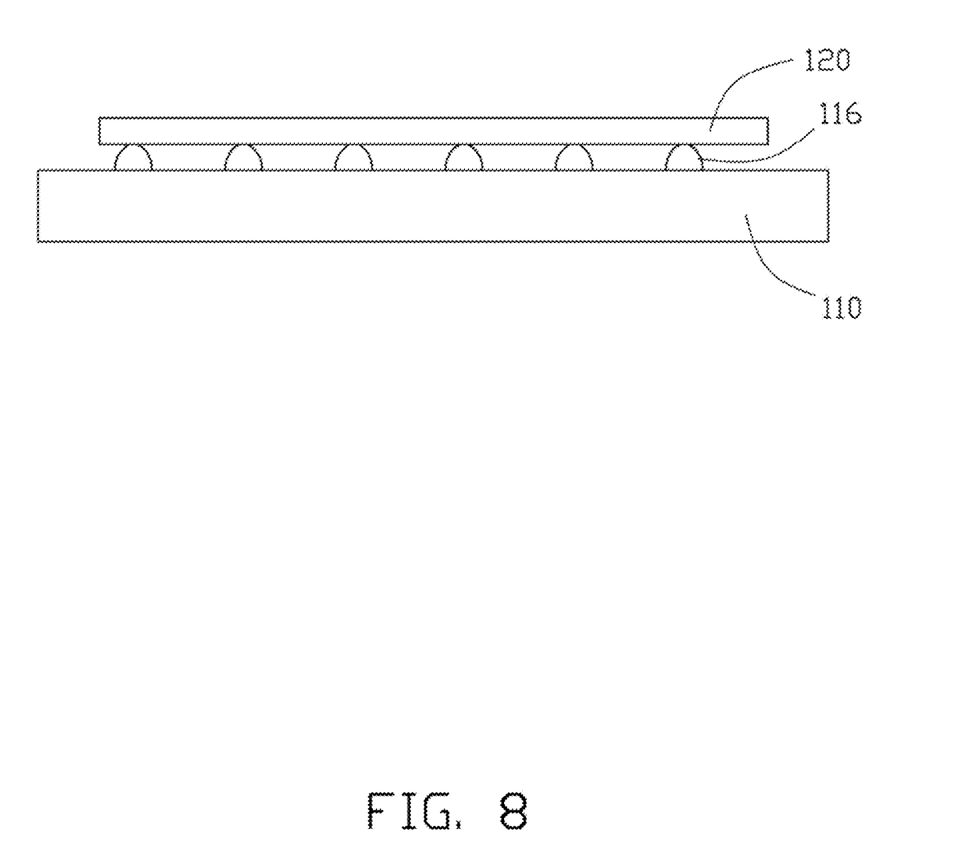
FIG. 8 shows a lateral view of a carbon nanotube film structure located on a support region of the carbon nanotube film supporting structure of FIG. 7.

In step (S2), in one embodiment, referring to FIG. 7 and FIG. 8, when the carbon nanotube film structure 120 is placed on the support region 114 of the carbon nanotube film supporting structure 100, the carbon nanotube film structure 120 is suspended by the protruding structures 116. Because most part of the carbon nanotube film structure 120 is suspended by the protruding structures 116, the effective contact area between the carbon nanotube film structure 120 and the carbon nanotube film supporting structure 100 can be less than or equal to 20% of the total area of the carbon nanotube film structure 120. The van der Waals force between the carbon nanotube film structure 120 and the carbon nanotube film supporting structure 100 is small. The van der Waals force between the carbon nanotube film structure 120 and the carbon nanotube film supporting structure 100 is less than the van der Waals force between the adjacent carbon nanotubes in the carbon nanotube film structure 120. Therefore, the carbon nanotube film structure 120 can be peeled off easily from the carbon nanotube film supporting structure 100 without damaging the carbon nanotube film structure 120. The carbon nanotube film structure 120 is protected by the carbon nanotube film supporting structure 100 when the carbon nanotube film structure 120 is transferred from the carbon nanotube film supporting structure 100.

In the step (S2), if the carbon nanotube film structure 120 includes a number of carbon nanotube films, the carbon nanotube films can be applied on the support region 114 successively. The carbon nanotube film in the carbon nanotube film structure can be overlapped with each other or located apart from each other.

Figure 9:
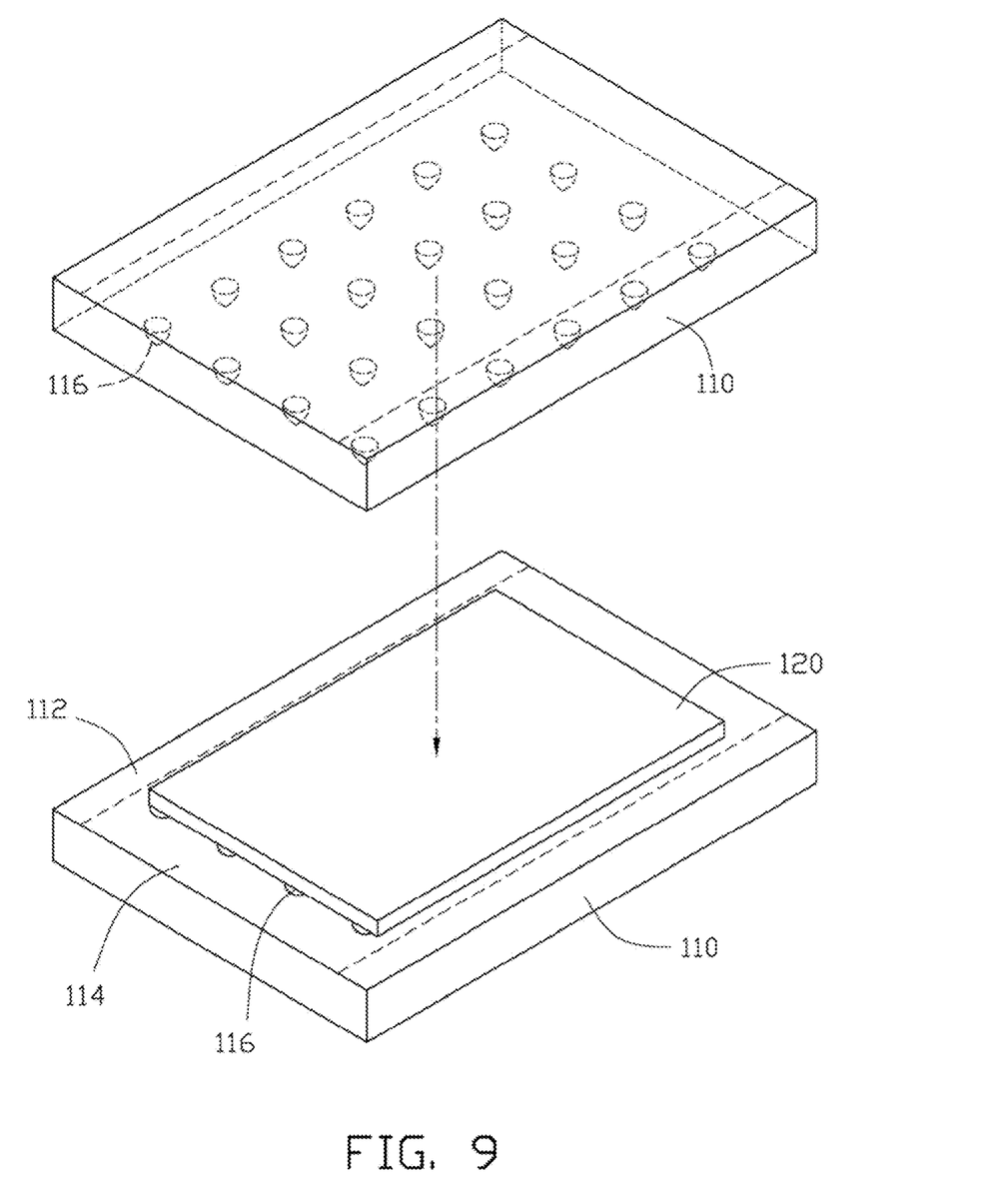
FIG. 9 shows a schematic structural view of applying another carbon nanotube film structure to cover the carbon nanotube film structure of FIG. 8 according to one embodiment.
Figure 10:
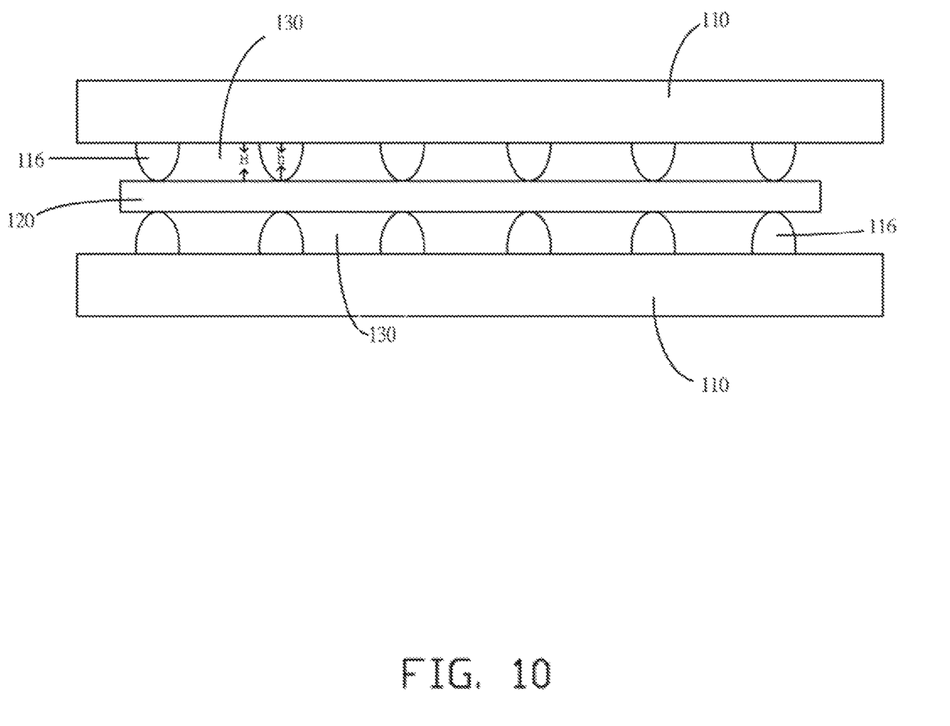
FIG. 10 shows a lateral view of a carbon nanotube film structure located by the support region between two carbon nanotube film supporting structures according to one embodiment.

Referring to FIGS. 9 and FIG. 10, in another embodiment, after the step (S2), a step (S3) of applying another carbon nanotube film supporting structure 100 on a surface of the carbon nanotube film structure 120 can be further provided. In the step (S3), the carbon nanotube film structure 120 is located between the two carbon nanotube film supporting structures to form a layered structure. When a layered structure is formed, the carbon nanotube film structure 120 is secured and protected by the support region 114 between the two carbon nanotube film supporting structures 100. The structures of the two carbon nanotube film supporting structures 100 can be the same. Referring to FIG. 10, a hollow space 130 is defined by the carbon nanotube film structure 120, the first substrate 110 and adjacent protruding structures 116. A height H of the hollow space 130 is substantially the same as a height h of the protruding structure 116.

The method for using the carbon nanotube film supporting structure has at least the following advantages. First, it is very convenient to support or protect the carbon nanotube film structure by placing the carbon nanotube film structure on the carbon nanotube film supporting structure. Second, if the carbon nanotube film structure is secured by the two carbon nanotube film supporting structures, the carbon nanotube film structure can be firmly fixed. Furthermore, the layered structure can prevent the carbon nanotube film structure from the external destruction and dust.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A method for using a carbon nanotube film supporting structure comprising:
   providing a carbon nanotube film supporting structure comprising:
   a first sub-supporting structure comprising a first substrate and a plurality of first protruding structures, the first substrate having a first surface defining a first support region, the plurality of first protruding structures distributed on the first support region, a ratio of a sum of a plurality of first surface areas, defined by a top of the plurality of first protruding structures, to an area of the first support region, is less than or equal to 20%; and a second sub-supporting structure comprising a second substrate and a plurality of second protruding structures, the second substrate having a second surface defining a second support region, the plurality of second protruding structures distributed on the second support region; and placing a carbon nanotube film structure on the first and second support regions between the first and second sub-supporting structures; wherein the carbon nanotube film structure directly faces the first surface of the first substrate and the second surface of the second substrate; and a hollow space is defined by the carbon nanotube film structure, the first substrate and adjacent first protruding structures, and a height of the hollow space is substantially a same as a height of the first protruding structures.

2. The method of claim 1, wherein the carbon nanotube film structure is fixed by the plurality of first and second protruding structures.

3. The method of claim 1, wherein the carbon nanotube film structure is combined with the plurality of first and second protruding structures only by van der Waals force.

4. The method of claim 1, wherein the carbon nanotube film structure comprises at least one carbon nanotube film.

5. The method of claim 4, wherein the at least one carbon nanotube film comprises a plurality of carbon nanotubes, and each carbon nanotube is joined to an adjacent carbon nanotube arranged substantially along a same direction, by van der Waals force.

6. The method of claim 5, wherein the at least one carbon nanotube film is drawn from a carbon nanotube array.

7. The method of claim 5, wherein the at least one carbon nanotube film is a free-standing film.

8. The method of claim 1, wherein the ratio of the sum of the plurality of first surface areas to the area of the first support region, is less than or equal to 10%.

9. The method of claim 1, wherein the plurality of first protruding structures comprises a plurality of dotted protruding structures distributed uniformly on the first support region.

10. The method of claim 9, wherein a diameter of the plurality of dotted protruding structures is in a range from about 1 micrometer to about 1000 micrometers; and a distance between adjacent dotted protruding structures is in a range from about 10 micrometers to about 10 millimeters.

11. The method of claim 1, wherein the plurality of first protruding structures comprises a plurality of linear protruding structures distributed uniformly on the first support region.

12. The method of claim 11, wherein a width of the plurality of linear protruding structures is in a range from about 1 micrometer to about 100 micrometers; and a distance between adjacent linear protruding structures is in a range from about 10 micrometers to about 1 millimeter.

13. The method of claim 11, wherein a height of the plurality of linear protruding structures is in a range from about 1 micrometer to about 1000 micrometers.

14. The method of claim 1, wherein the first substrate and the plurality of first protruding structures are an integral structure.

15. The method of claim 1, wherein a material of the plurality of first protruding structures is selected from the group consisting of metal, metal oxide, inorganic salts, and ceramics, or resin.

16. The method of claim 1, wherein the carbon nanotube film supporting structure comprises abrasive paper.

17. The method of claim 16, wherein the abrasive paper is selected from the group consisting of NO. 50 up to and including NO. 2000 abrasive paper.

18. A method for using a carbon nanotube film supporting structure comprising:
providing a carbon nanotube film supporting structure comprising a first sub-supporting structure comprising:
a first substrate having a first surface defining a first support region; and
a plurality of first protruding structures distributed on the first support region;
wherein, a ratio of a sum of a plurality of first surface areas, defined by a top of the plurality of first protruding structures away from the substrate, to an area of the first support region, is less than or equal to 20%; and
a second sub-supporting structure comprising:
a second substrate having a second surface defining a second support region; and
a plurality of second protruding structures distributed on the second support region; and
providing a carbon nanotube film structure secured by the first and second support regions between the first and second sub-supporting structures; wherein the carbon nanotube film structure directly faces the first surface of the first substrate and the second surface of the second substrate; and a hollow space is defined by the carbon nanotube film structure, the first substrate and adjacent first protruding structures, and a height of the hollow space is substantially a same as a height of the first protruding structures.

* * * * *